United States Patent [19]

Charlton et al.

[11] 3,966,857

[45] June 29, 1976

[54] LUBRICATION OF EXTRUDED MATERIALS

[75] Inventors: Ralph W. Charlton, Newfoundland; Seevaram N. Varadhachary, North Plainfield, both of N.J.

[73] Assignee: Congoleum Industries, Inc., Kearny, N.J.

[22] Filed: Dec. 31, 1969

[21] Appl. No.: 889,527

[52] U.S. Cl. ............................ 264/75; 264/176 R; 264/211; 264/245; 264/349
[51] Int. Cl.² ........................................ B29C 21/00
[58] Field of Search ......... 264/75, 245, 211, 176 R, 264/349, 123, 128

[56] References Cited
UNITED STATES PATENTS

| | | | |
|---|---|---|---|
| 2,298,846 | 10/1942 | Skooglund | 264/349 |
| 2,477,170 | 7/1949 | Broderson et al. | 264/75 |
| 2,540,146 | 2/1951 | Stober | 264/211 |
| 2,798,258 | 7/1957 | Allan et al. | 264/75 |
| 2,806,254 | 9/1957 | Craig | 264/128 |
| 2,857,624 | 10/1958 | Hanzel et al. | 264/177 R |
| 3,049,761 | 8/1962 | Yakubik | 264/211 |
| 3,066,356 | 12/1962 | Porter | 264/211 |
| 3,121,914 | 2/1964 | Olson et al. | 264/211 |
| 3,148,412 | 9/1964 | Spreeuwers | 264/211 |
| 3,484,507 | 12/1969 | Smith | 264/176 R |

*Primary Examiner*—Jeffery R. Thurlow
*Attorney, Agent, or Firm*—Richard T. Laughlin

[57] ABSTRACT

A method for extruding synthetic resinous materials including introducing a mixture of softened variously or similarly colored or clear resinous chips into an extruder, coating the chips with a coating agent such as a lubricant in the barrel of the extruder, extruding the mixture through an extrusion die thereby to produce a finished product of fused resinous chips maintaining good color definition between the chips.

2 Claims, 2 Drawing Figures

LUBRICATION OF EXTRUDED MATERIALS

This invention relates to an improved method for extruding resinous systems, and more particularly resinous systems including a mixture of differently colored synthetic resin chips.

BACKGROUND OF THE INVENTION

Synthetic resin sheeting material has developed into a very useful product for surface coverings such as floor and wall coverings, upholstering materials, and a variety of decorative articles. Also, other shapes such as rods may be produced for a number of different uses. Much of the material now being produced from synthetic resin is produced by extrusion processes. One of the methods used for producing a more decorative and aesthetically pleasing product is to use a mixture of colored chips introduced into the barrel of the extruder and forced out through the die. The resulting product has a mosaic-type appearance.

One of the problems encountered in producing this latter type of product is that the color of the individual chips tended to bleed into the adjacent chips, producing a striated or variegated appearance. Thus, the mosaic appearance is lost. This is particularly true if all of the chips are made of the same type of resin such as polyvinyl chloride.

OBJECTS OF THE INVENTION

It is therefore a primary object of this invention to overcome the above-mentioned difficulties encountered when extruding a multi-colored system.

A further object of this invention is to provide an extruded resinous sheeting including previously softened colored chips therein with good definition between the colors of the chips.

Still a further object of this invention is to provide a method for producing an extruded decorative sheeting from a mixture of colored chips.

Yet another object of this invention is to provide a method for coating colored chips to prevent a mixing of their colors in the extruder to produce a product having clearly defined areas of color.

Another object of this invention is to provide a method for extruding a resinous system including a plurality of colored chips wherein a distinct separation occurs in the finished product between adjacent chips.

These and other objects and advantages of this invention will be apparent from the following descriptions and claims.

DESCRIPTION OF THE INVENTION

Figure 1:
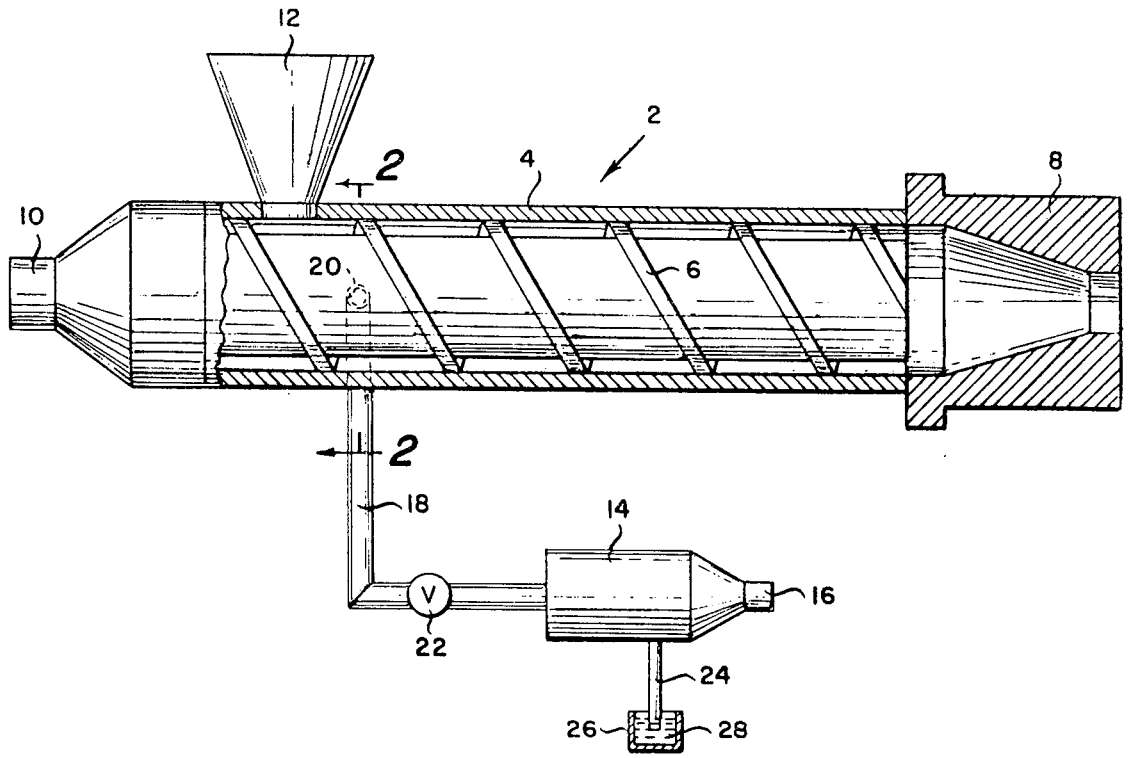
FIG. 1 is a longitudinal cross sectional view of a typical extruder with which the method of this invention may be used.
Figure 2:
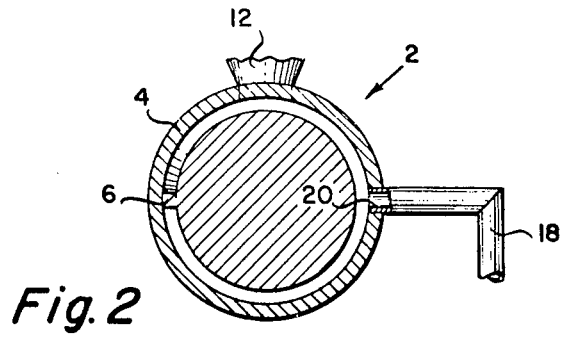
FIG. 2 is a section along the lines 2—2 of FIG. 1.

In FIG. 1 there is shown an extruder generally designated 2 having a barrel 4 and a screw pump 6. At one end of the barrel 4 there is provided an extrusion die 8, and at the other end of barrel 4 there is provided a suitable drive means 10 for the extruder screw 6. Hopper 12 supplies the resinous chips to the barrel of extruder 2.

A pump 14 is shown having a drive mechanism 16 of any suitable construction, and the discharge of pump 14 passes through line 18 to port 20 in the extruder barrel 4. A valve 22 is provided in line 18 to control the feed of material therethrough.

Line 24 connects the inlet side of pump 14 with a reservoir 26 containing a suitable agent 28 for coating the chips being extruded. The coating agent will be described later.

In operation, a charge is fed into hopper 12, the charge consisting of a mixture of colored resinous chips. A typical formulation of the charge is shown in Table I. The components of the charge and their relative percentages are shown merely by way of example, as thermoplastic resins other than polyvinyl chloride such as polyurethane, polyethylene, polyvinyl copolymers, polypropylene and the like could be used. However, polyvinyl chloride has been shown to exhibit exceptional wear properties when used as floor coverings and the like, and for this reason, it is used by way of example here. It is to be understood that not all of the chips are necessarily made of the same component, as chips of polyvinyl chloride, polyethylene, and polyurethane could be mixed within the same product.

TABLE I

|  | PARTS |
| --- | --- |
| General Purpose PVC Homopolymer | 100 |
| Plasticizer | 45 |
| Calcium Carbonate Filler | 140 |
| Epoxy Plasticizer | 5 |
| Talc Filler | 40 |
| Stabilizer | 4 |
| Solid Lubricant | 3 |
| Pigment | 4 |

When the extrusion process begins, the feed zone of the extruder is at a temperature range of about 220° to about 245° F., the transition and metering zone of the extruder are at a temperature of about 255° to about 285°F., and the extrusion die is at a temperature of about 320° to about 355°F. The extruder screw turns at a rate of about 30 to about 50 revolutions per minute. When the extrusion process begins, a coating agent 28 is pumped into the extruder barrel 4 through port 20. A coating agent which is suitable for use in this invention, is one which has limited compatibility with the plastic at the operating temperature of the extruder, and which will tend to exude to the surface to provide a coating on the plastic, reducing the co-efficient of friction between the particles and the metallic surfaces of the extruder. Such coating agents may be lubricating oils, paraffinic hydrocarbons, a variety of mineral oils, or various cuts or fractions of petroleum. Other materials such as fatty acids, fatty acid soaps, amides or waxes could also be used as the lubricant. The suitability of the various oils for lubricating the chips would be dependent upon the viscosity of the oil and its aniline point, but should be capable of injection either as a liquid or for example a molten solid. The proportion of added lubricant to composition is controlled by the relative rates of extrusion and injection, but would normally be about 0.1 to about 5%.

When the coating agent is injected into the barrel of the extruder, the oil tends to coat the chips of resin, and the coating in turn tends to minimize the mixing of the resinous chips and thus prevent bleeding of colors. Thus, the color remains distinctly within the chips.

Tests were conducted using the formulation of TABLE I with colored, polyvinyl chloride chips. A comparison was made between the product obtained using no coating agent, and that obtained using a lubricant sold under the registered trademark BLANDOL by the Witco Chemical Company. This lubricant is a light white mineral oil and has identification number NF19004. The Saybolt viscosity of this oil was 86 at 100°F. A very good decoration in the sheeting was obtained by using this lubricant, and the product showed very good color definition between the chips as compared to the unlubricated product.

While this invention has been described, it will be understood that it is capable of further modifications, and this application is intended to cover any variations, uses, or adaptations of the invention following in general, the principle of the invention and including such departures from the present disclosure as come within known or customary practice in the art to which the invention pertains, and as may be applied to the essential features hereinbefore set forth as fall within the scope of the invention or the limits of the appended claims.

What we claim is:

1. A method of producing an extruded resinous product having a mosaic-like appearance wherein the surface of the product is characterized by a plurality of random distinct lines of demarcation dividing the surface of the product into a plurality of distinct adjacent areas comprising:
   a. providing a blend of thermoplastic resinous chips selected from the group consisting of polyvinyl chloride, polyurethane, polyethylene, polypropylene, polyvinyl copolymers and mixtures thereof,
   b. feeding said blend of thermoplastic resinous chips to the barrel of an extruder at the hopper end of the extruder,
   c. softening and moving said blend of thermoplastic resinous chips in the barrel of the extruder without melting said chips,
   d. applying a liquid lubricative coating agent selected from the group consisting of lubricating oils, paraffinic hydrocarbons, mineral oils, and oil fractions of petroleum to said softened blend of thermoplastic resinous chips by injecting said lubricative coating agent into the barrel of the extruder downstream from the hopper end thereof, and feeding said blend and said agent in said barrel towards the extrusion end of said extruder while mixing the same, and
   e. extruding said softened blend of thermoplastic resinous chips into a desired product wherein substantially all of said thermoplastic resinous chips retain their individuality in said product,
   f. thereby producing an extruded product having a mosaic-like appearance in which said thermoplastic chips are visually distinct one from another.

2. A method as in claim 9 and wherein:
   a. said blend of thermoplastic resinous chips comprises a blend of variously colored thermoplastic resinous chips.

* * * * *